(12) United States Patent
Merswolke et al.

(10) Patent No.: US 8,502,403 B2
(45) Date of Patent: Aug. 6, 2013

(54) MULTIPLE GENERATOR WIND TURBINE AND METHOD OF OPERATION THEREOF

(75) Inventors: Paul H. F. Merswolke, Bognor (CA); Na'al Nayef, Orangeville (CA); Neil J. Nicholson, Ayr (CA); Gregor Pestka, Waterloo (CA); James L. Jantzi, Milverton (CA); Brent A. Cameron, Waterloo (CA); Craig W. Harris, Stratford (CA); Jason P. Beattie, Waterloo (CA); Martin Queckenstedt, Stratford (CA); Ping Chen, Waterloo (CA)

(73) Assignee: New World Generation Inc., Owen Sound, Ontario (CA)

( * ) Notice: Subject to any disclaimer, the term of this patent is extended or adjusted under 35 U.S.C. 154(b) by 502 days.

(21) Appl. No.: 12/523,702

(22) PCT Filed: Jan. 17, 2008

(86) PCT No.: PCT/CA2008/000082
§ 371 (c)(1),
(2), (4) Date: Nov. 10, 2010

(87) PCT Pub. No.: WO2008/086608
PCT Pub. Date: Jul. 24, 2008

(65) Prior Publication Data
US 2011/0133453 A1   Jun. 9, 2011

Related U.S. Application Data

(60) Provisional application No. 61/021,556, filed on Jan. 16, 2008, provisional application No. 60/885,369, filed on Jan. 17, 2007.

(51) Int. Cl.
*F03D 9/00*  (2006.01)
*H02P 9/04*  (2006.01)

(52) U.S. Cl.
USPC ............................................ 290/44

(58) Field of Classification Search
USPC ............................. 290/44, 55, 40 C
See application file for complete search history.

(56) References Cited

U.S. PATENT DOCUMENTS

| | | | |
|---|---|---|---|
| 4,585,950 A * | 4/1986 | Lund | 290/44 |
| 5,743,712 A * | 4/1998 | Aylor | 416/42 |
| 7,042,110 B2 * | 5/2006 | Mikhail et al. | 290/44 |
| 8,257,019 B2 * | 9/2012 | Cironi et al. | 415/4.3 |
| 2003/0170123 A1 * | 9/2003 | Heronemus | 416/41 |
| 2006/0275121 A1 * | 12/2006 | Merswolke et al. | 416/132 B |

* cited by examiner

*Primary Examiner* — Javaid Nasri
(74) *Attorney, Agent, or Firm* — Daryl W. Schnurr

(57) ABSTRACT

A wind turbine has a plurality of blades mounted on a rotor, the rotor has a rotatable shaft with a drivewheel extending therefrom. A plurality of wheels are in continuous rotatable contact with the drivewheel and are connected to drive a plurality of generators to produce energy. A controller is connected to control the number of generators that are generating between zero and all of the generators based on the speed of the blades. A method of operating the wind turbine uses a controller to control the number of generators that are generating based on the speed of the rotor.

38 Claims, 8 Drawing Sheets

MULTIPLE GENERATOR WIND TURBINE AND METHOD OF OPERATION THEREOF

BACKGROUND OF THE INVENTION

1. Field of the Invention

This invention relates to a wind turbine and to a method of operation thereof where the wind turbine has a variable speed rotor and a plurality of generators, the wind turbine being controlled by a controller to add more generators at higher speeds and to shut down generators at lower speeds.

2. Description of the Prior Art

It is known to have wind turbines where the speed of a rotor is maintained substantially constant despite changing wind speeds by means of a gear box. However, gear boxes are expensive and have been known to fail prematurely, thereby resulting in down time for the wind turbine as the gear box is replaced or repaired. Some previous wind turbines have braking systems on the blades to maintain the blades at a substantially constant speed despite changes in the wind conditions. However, braking systems often become worn and require replacement. Further, braking systems can be an inefficient way to operate a wind turbine because of the energy expended to operate the braking system to maintain constant speed. Yaw controls and pitch controls are also known to be used on wind turbines to assist in operating the turbine at a substantially constant speed. The purpose of operating the previous turbines at a substantially constant speed is to be able to produce AC current at the output of the turbine, the AC current having a frequency that allows the output power to be transmitted into a grid.

SUMMARY OF THE INVENTION

It is an object of the present invention to provide a wind turbine drive system that manages the torque transmitted through the mechanism so that torque above design levels and rates of change of torque above design levels are not achieved. It is a further object of the present invention to provide a wind turbine with a variable speed rotor and a plurality of generators with a controller to activate and de-activate the generators in response to variations in wind speed and direction as determined by monitoring various parameters relating to the wind turbine. It is still a further object of the present invention to control the pitch and yaw of a wind turbine along with multiple generators that allow wide ranging power production with friction coupled mechanical drive components that will allow torque peaks to be avoided by slippage between the components when torque exceeds a prescribed level. It is a further object of the present invention to control a speed of a wind turbine by using a braking system in extreme weather conditions to shut down the wind turbine.

A wind turbine comprises a plurality of blades mounted on a rotor, the rotor having a rotatable shaft with a drivewheel extending outward therefrom. The drivewheel rotates with the shaft and the rotor as the blades rotate, the rotor having a broad range of speed. A plurality of wheels is in continuous rotatable contact with the drivewheel, the wheels being connected to drive a plurality of generators to produce energy. A turbine has various means for controlling a speed of the blades comprising at least two selected from the group of pitch, yaw and brakes. A controller is connected to control the number of generators that are generating between zero and all of the generators based on the speed of the blades, while controlling at least two of the pitch, yaw and brakes and monitoring parameters relating to the speed of the blades.

A wind turbine comprises a plurality of blades mounted on a rotor, the rotor having a rotatable shaft with a drivewheel extending outward therefrom. The drivewheel rotates with the shaft and the rotor as the blades rotate, the rotor having a broad range of speed. A plurality of wheels are in continuous rotatable contact with the drivewheel. The wheels are connected to drive a plurality of generators to produce electricity. The wind turbine does not have a gear box and operates at a variable speed to produce power from the generators that can be synchronized to a grid.

A method of operating a wind turbine uses a plurality of blades mounted on a hub to form a rotor. The rotor is mounted on a shaft with a drivewheel thereon. A plurality of wheels is in rotatable contact with the drivewheel, the wheels being connected to drive a plurality of generators to produce electricity. The turbine has various means for controlling the speed of the rotor comprising at least two selected from the group of pitch control, yaw control and brakes. A controller is connected to control the number of generators that are generating based on the speed of the rotor. The method comprises programming the controller to monitor wind speed, wind direction, rotor speed, yaw direction, one of brakes and pitch, number of generators, number of generators currently generating and torque of rotor shaft. Commencing with start-up, the controller releases the rotor to accelerate when an average wind speed is within an operating range over a predetermined minimum time period. When the rotor reaches a minimum speed required, the controller places a load on the first generator, the controller phasing in different generators when a torque of the rotor shaft times a total number of generators divided by the number of active generators is greater than a predetermined minimum torque for phasing in an additional generator. The controller phases out one generator when a torque of the rotor shaft times the total number of generators divided by the number of active generators is less than the predetermined minimum torque required for phasing out one generator. The controller phases in and phases out generators as required depending on the torque of the rotor shaft and the number of generators generating. The controller phases out a last active generator when the torque of the rotor shaft is below a predetermined minimum to operate one generator and stopping the rotor and generators. The controller stops the rotor and phases out all generators when an average wind speed over a predetermined time is greater than a maximum predetermined wind speed, the controller placing a load on additional generators when the wind speed increases within the operating range and removing the load from additional generators as the wind speed decreases within the operating range. The controller operates each wind turbine to generate energy in a broad range from a minimum rotor speed required to operate one generator to a maximum rotor speed required to operate all generators.

A method of operating a wind turbine where the wind turbine has a plurality of blades mounted on a hub to form a rotor. The rotor is mounted on a shaft, the shaft having a drivewheel thereon. A plurality of wheels is in rotatable contact with the drivewheel. The wheels are connected to drive a plurality of generators to produce electricity, the turbine having various means of controlling the speed of the rotor. The method comprises connecting the controller to monitor several parameters relating to wind speed and wind direction and speed of the drivewheel, connecting the controller to adjust one or more of yaw, pitch, brakes and number of generators generating in response to changes in one or more of the parameters, programming the controller to adjust any two of yaw, pitch and brakes to control the speed of the drivewheel and to increase and decrease the number of generators generating as the speed of the drivewheel increases and decreases respectively.

A method of operating a wind turbine is provided where the wind turbine comprises a plurality of blades mounted on a hub to form a rotor. The rotor is mounted on a shaft and the shaft has a drivewheel thereon. A plurality of wheels are in rotatable contact with the drivewheel, the wheels being connected to drive a plurality of generators to produce electricity. The turbine has various means for controlling the speed of the rotor, the generators being connected to an electricity supply to operate the generators as motors. The method comprises connecting the controller to monitor several parameters relating to wind speed, wind direction, and speed of the drivewheel, connecting the controller to adjust one or more of yaw, pitch, brakes, generator torque demand and number of generators generating in response to changes in one or more of the parameters, programming the controller to determine when the wind speed is sufficient to rotate the blades, but insufficient to overcome the force required to commence rotation of the blades. The controller then supplies electricity to the generators and operates the generators as motors to commence rotation of the blades until the turbine reaches an operating range of speed.

A method of operating a wind turbine is provided, the wind turbine comprising a plurality of blades mounted on a hub to form a rotor. The rotor is mounted on a shaft, the shaft having a drivewheel thereon. A plurality of wheels are in rotatable contact with the drivewheel, the wheels being connected to drive a plurality of generators to produce electricity, the generators being capable of operation at a torque demand of up to 150%. The turbine has various means for controlling the speed of the rotor, the turbine having a controller to monitor several parameters relating to wind speed, wind direction and speed of the drivewheel. The method comprises programming the controller to use the generators as an electric brake with a torque demand of up to 150% to stop the turbine and to discontinue the torque demand when the turbine has stopped.

A method of operating a wind turbine is provided, the wind turbine comprising a plurality of blades mounted on a hub to form a rotor. The rotor is mounted on a shaft, the shaft having a drivewheel thereon. A plurality of wheels are in rotatable contact with the drivewheel, the wheels being connected to drive a plurality of generators to produce electricity. The turbine has various means for controlling the speed of the rotor, the turbine having a controller to monitor several parameters relating to wind speed, wind direction and speed of the drivewheel. The method comprises programming the controller to use the generators at a torque demand at higher than rated load to overcome wind gusts that would otherwise increase a speed of the rotor above a maximum operating speed.

DETAILED DESCRIPTION OF A PREFERRED EMBODIMENT

Figure 1:
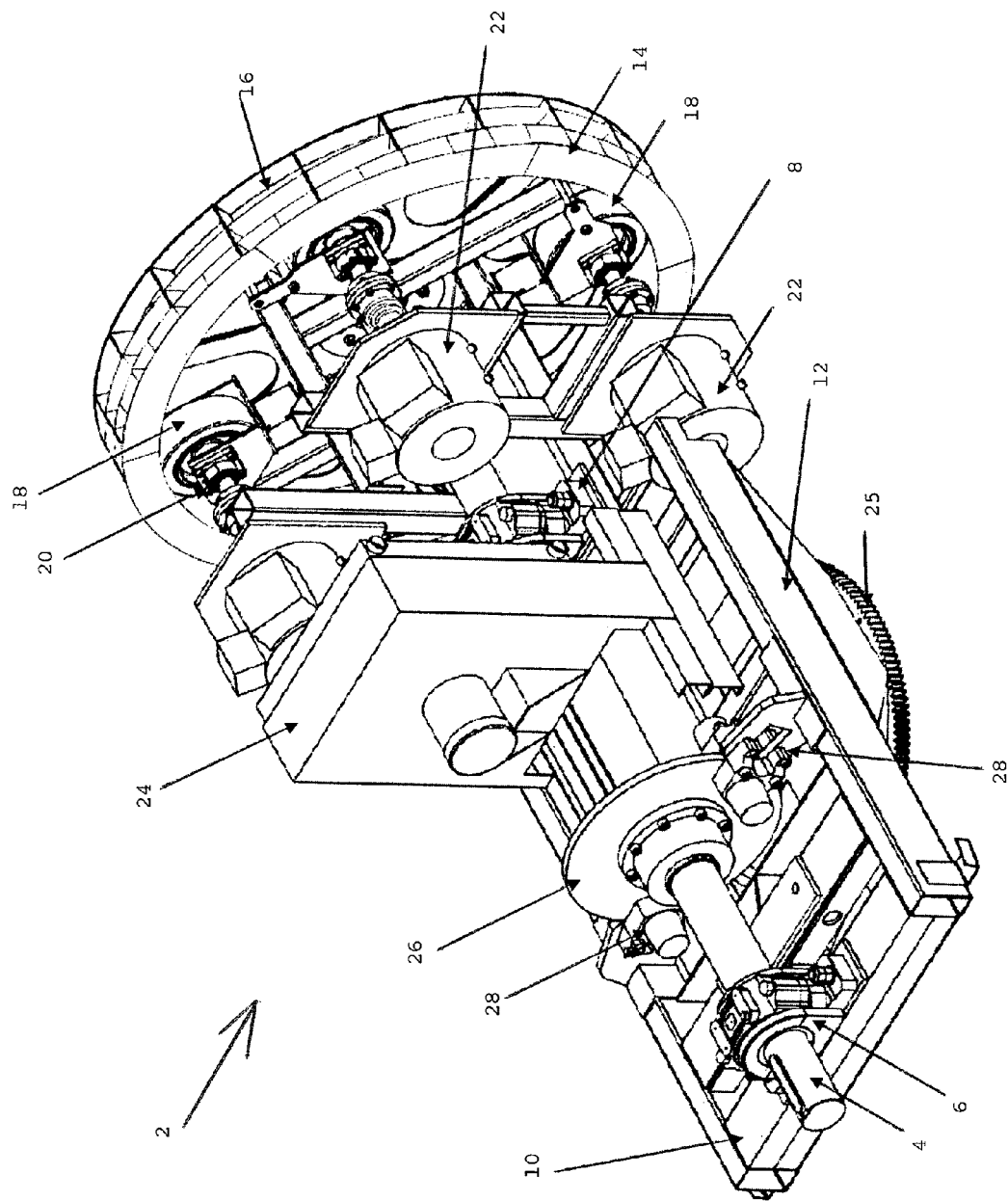
FIG. 1 is a partial perspective view of part of a drive system of a wind turbine when viewed from a front.
Figure 2:
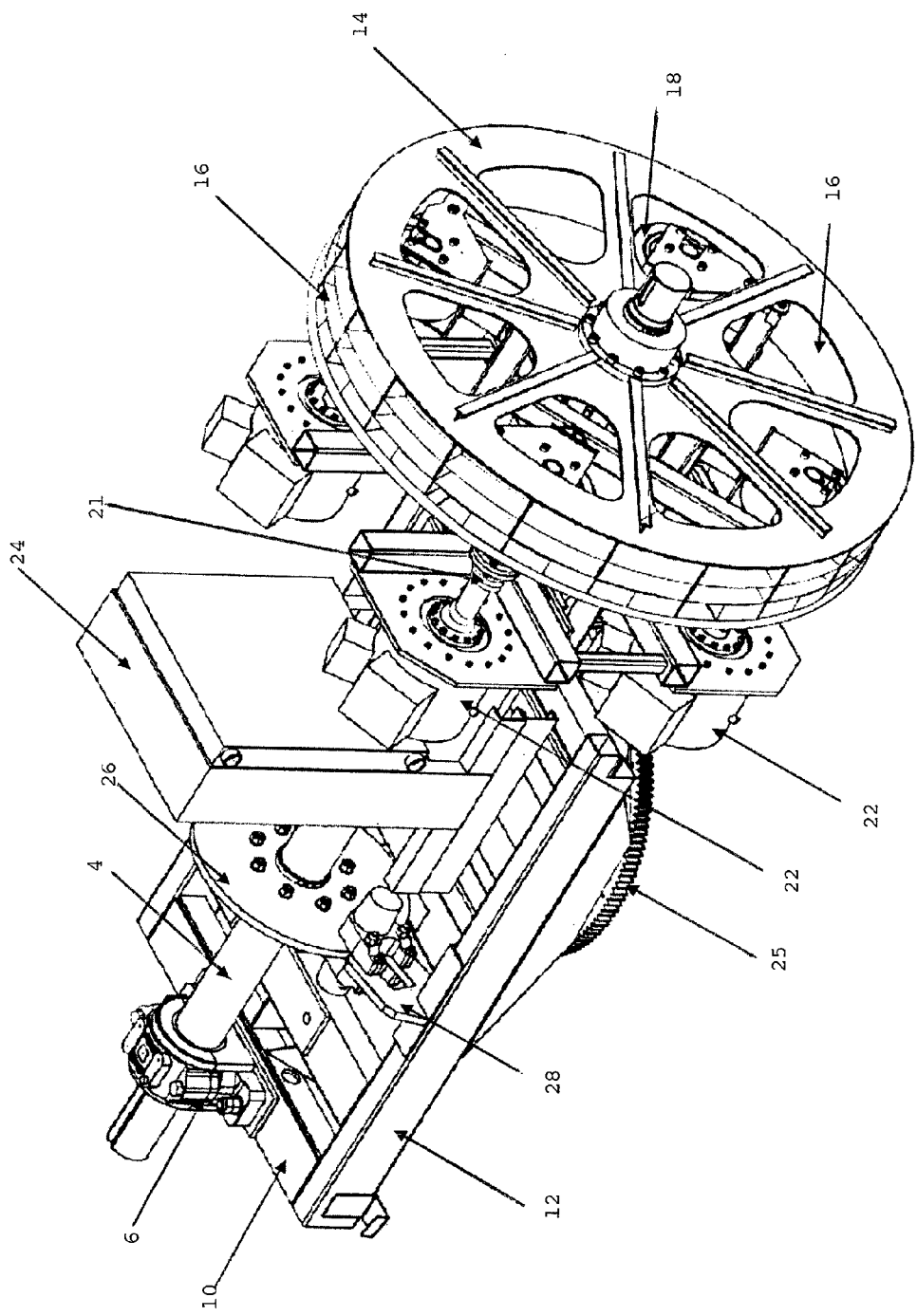
FIG. 2 is a partial perspective view of part of a drive system of a wind turbine when viewed from a rear.

In FIGS. 1 and 2, a drive system 2 of a wind turbine (not shown in FIGS. 1 and 2) has a shaft 4 that is rotatably mounted in bearings 6, 8. The bearings 6, 8 are mounted in a floor 10 of a main frame 12. The shaft 4 has a drivewheel 14 extending outward therefrom, the drivewheel 14 rotating with the shaft 4. The drivewheel 14 has a track 16 extending around a periphery thereof, the track 16 preferably having an inner surface that is parallel to a longitudinal axis of said shaft. There are a plurality of wheels 18 that are rotatably mounted to be in continuous contact with said track, the wheels rotating as said track rotates. Preferably, the wheels are in friction contact with said track. The wheels 18 each have a mechanical drive 20 connected to a generator 22. There are preferably a plurality of generators 22, and still more preferably there is one generator 22 for each wheel 18. In FIGS. 1 and 2, there are four wheels 18, four drive mechanisms 20 and four generators 22, only three of which are shown in FIG. 1. Preferably, the generators are electrical generators and each generator has an on/off switch that can be controlled by a controller to cause each generator to generate electricity or to prevent each generator from generating electricity independent of the other generators. Since the wheels 18 are in continuous contact with the track 16. The wheels 18 and the drive mechanism 20 for each wheel 18 will rotate as the track 16 rotates. Each of the four drive mechanisms includes a universal joint 21 (see FIG. 2). The generators will also rotate as the track rotates, but the on/off switch allows each of the generators to be loaded or unloaded as desired. The number of wheels, drive mechanisms and generators can vary to be more or fewer than the number shown in FIGS. 1 and 2. The drivewheel 14 has a diameter that is significantly smaller than a diameter of said blades.

Preferably, the generators are permanent magnet water cooled generators with a generator heat exchanger 24 connected to cool the generators. Beneath the main frame 12, there is located a yaw bearing 25. While the track 16 is preferred, the wheels can be orientated to contact another part of the drivewheel 14 and the track 16 can be eliminated.

A brake disk 26 extends outward from the shaft 4. The brake disk 26 extends between two brake callipers 28, one on each side of the main frame 12. The brake callipers 28 and the brake disk 26 form a brake system that is connected to a controller (not shown in FIGS. 1 and 2). The generators and particularly, the on/off switch of each generator are also connected to the controller (not shown in FIG. 1). The drive system 2 is mounted in a nacelle 29 (only part of which is shown), having a baseplate 31.

Figure 3:
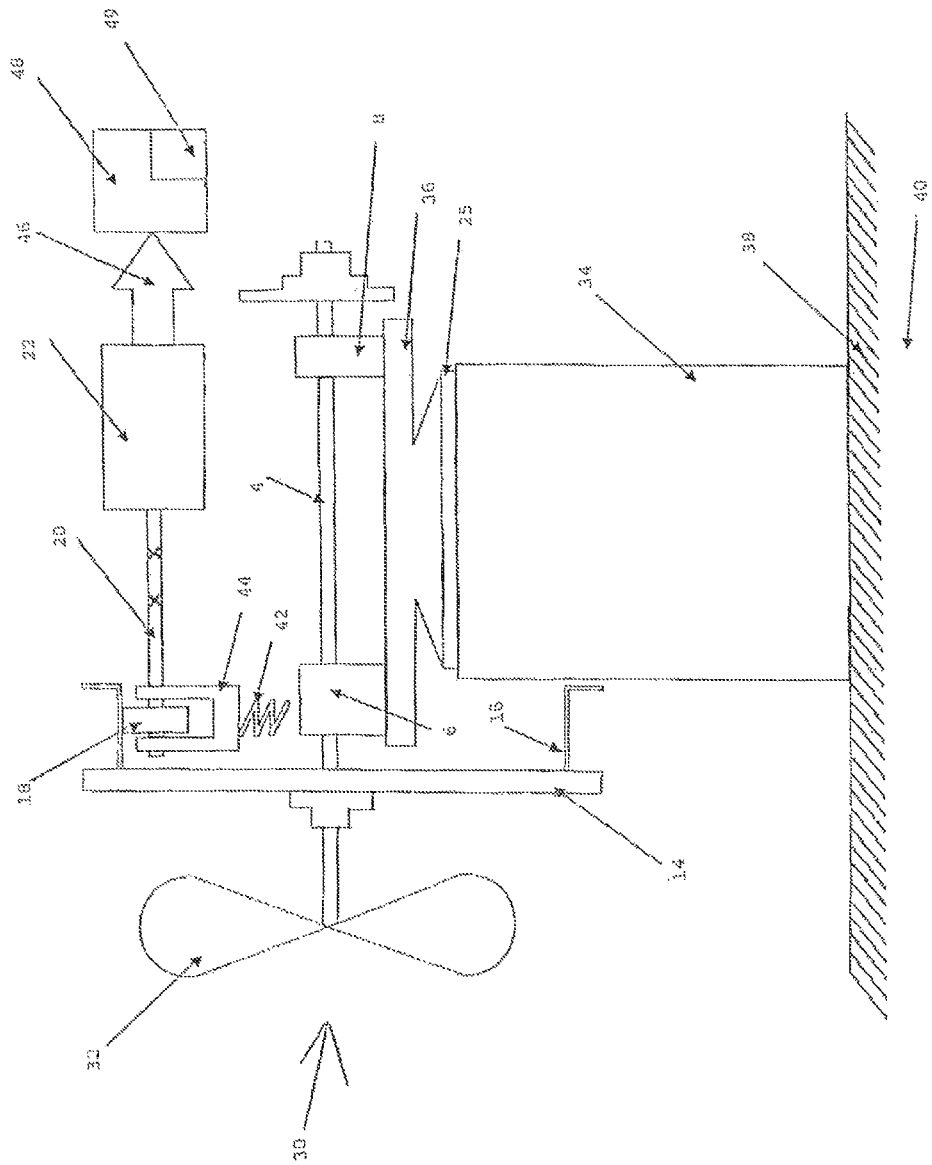
FIG. 3 is a schematic side view of a wind turbine drive system.

In FIG. 3, there is shown a schematic view of a further embodiment of a wind turbine and drive system of the present invention. A wind turbine 30 has blades mounted on a rotatable shaft 4 that is mounted in bearings 6, 8. Preferably, the bearing 6 is a thrust bearing. The wind turbine 30 is mounted on a tower 34 with the yaw bearing 25 supporting a nacelle structure 36. The tower is supported in a foundation 36 mounted in the ground 40. The brake disk 26 is slowed by brake callipers (not shown in FIG. 3). The drivewheel 14 has a track 16 extending outwardly from a periphery thereof, only one of the four wheels 18, mechanical drive 20 and generator 22 is shown in FIG. 3. Preferably, the drive mechanism includes a Schmidt coupling. A Schmidt coupling allows the wheels to drive the generators when shafts driven by the wheels are out of alignment with shafts of the generators. A helicon spring 42 on a tire carrier 44 ensures that the wheel 18 remains in contact with the track 16 as the track 16 rotates with the drivewheel 14. Each of the generators 22 is connected by cabling 46 to power electronics 48 which includes one or more controllers 49 that monitor various parameters and control the system. A universal joint or a CV (Constant Velocity) shaft can be used in place of the Schmidt coupling. The Schmidt coupling is represented by the two x's on the output shaft of the wheel and the input shaft of the generator.

Figure 4:
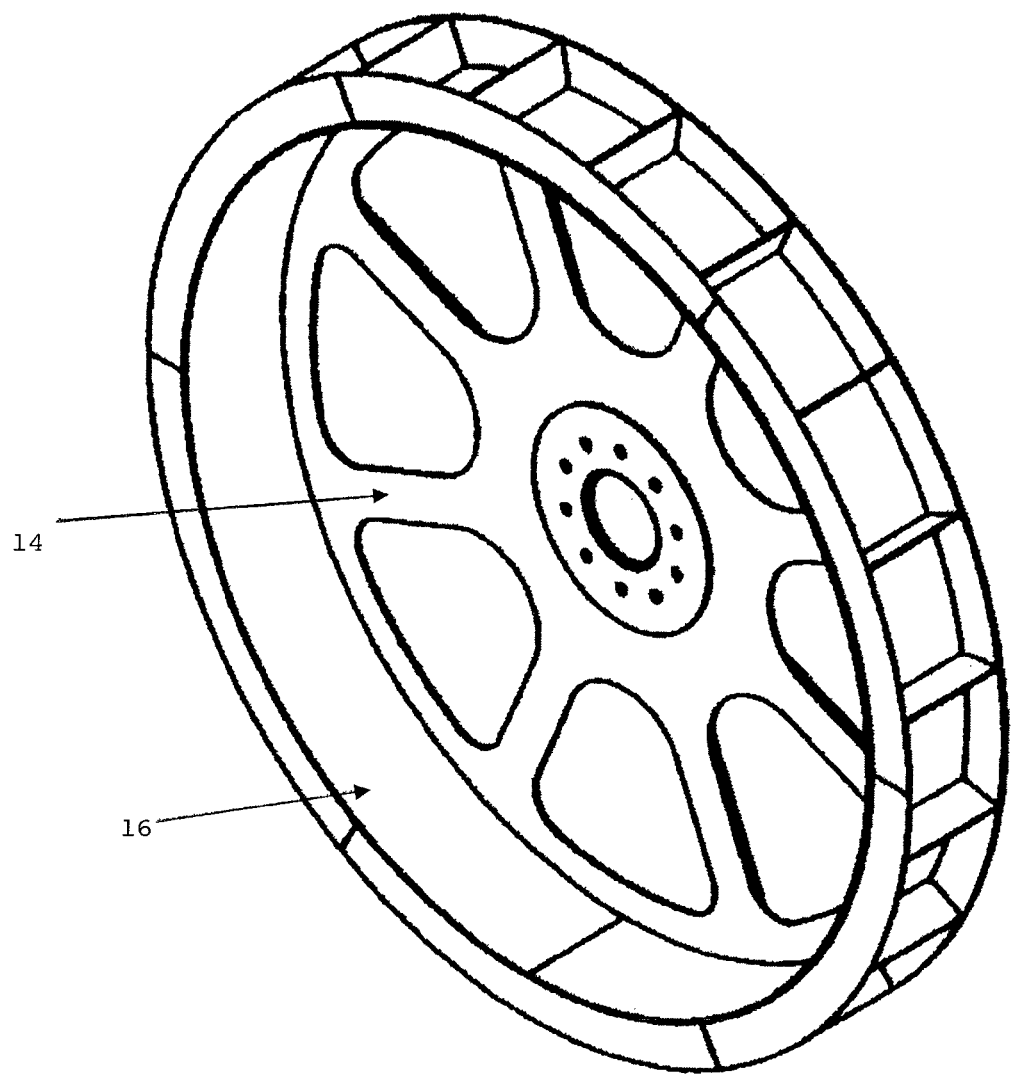
FIG. 4 is a perspective view of a friction drivewheel.
Figure 5:
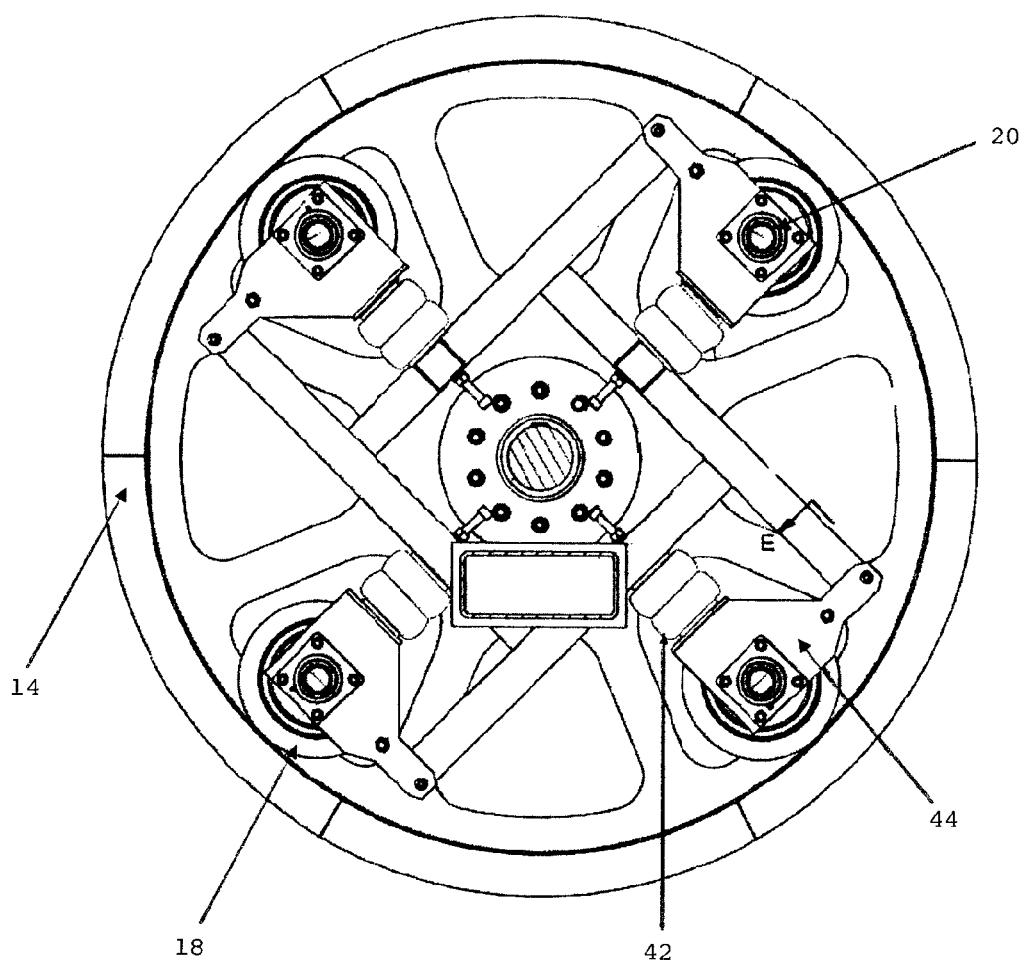
FIG. 5 is a side view of the friction drivewheel showing rotatable tires in contact with the drivewheel.
Figure 6:
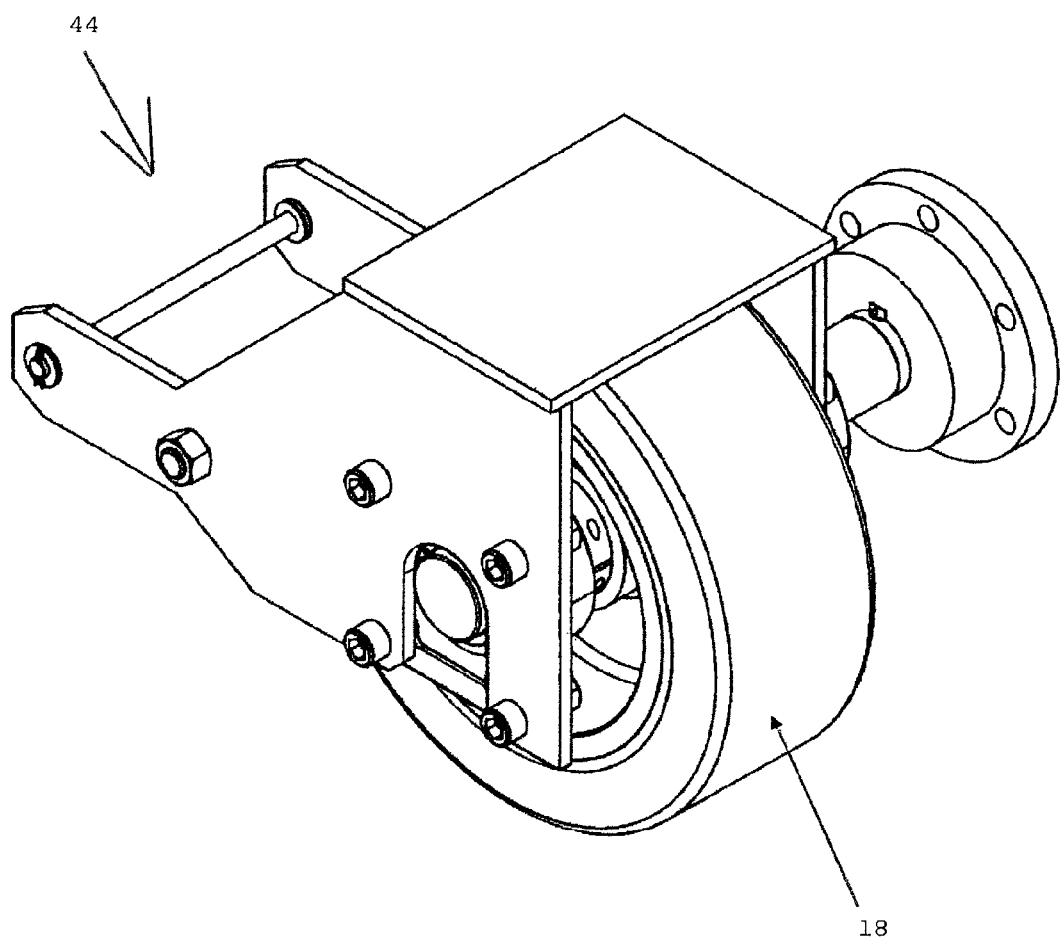
FIG. 6 is a perspective view of a tire carrier.

In FIG. 4, there is shown a perspective view of the drivewheel 14 and track 16. In FIG. 5, there is shown a side view of the drivewheel 14 with four wheels 18 in contact with the track 16. The wheels 18 are rotatably mounted in the wheel carriers 44. FIG. 6 is a perspective view of the wheel carrier 44. The wheel carrier is turned downward by a spring mounting (not shown in FIG. 6) in the orientation shown to maintain the wheel 18 in firm contact with the track (not shown in FIG. 6).

Figure 7:
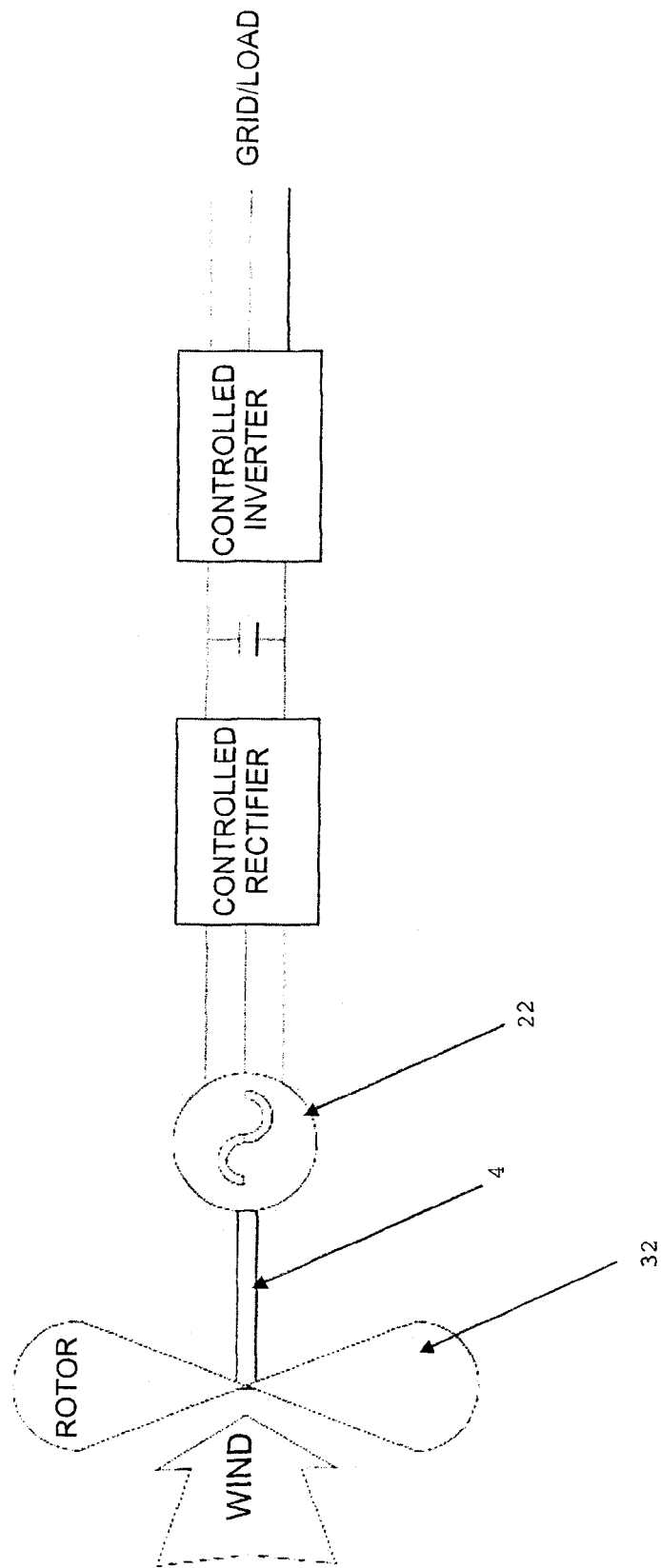
FIG. 7 is a schematic block diagram of power electronics to convert wind energy to alternating current.

FIG. 7 is a schematic block diagram of the power electronics portion of the system where wind rotates the rotor, which in turn rotates the shaft 4. The shaft 4 indirectly drives a permanent magnet three phase generator, which sends a power output to a controlled rectifier. The controlled rectifier controls the DC line voltage and the output from the rectifier is transmitted to a controlled inverter. The controlled inverter controls output voltage, frequency and power if the output is to be connected to the grid. The output from the controlled inverter is the required 60 Hertz three phase voltage or 50 Hertz three phase voltage as desired.

Figure 8:
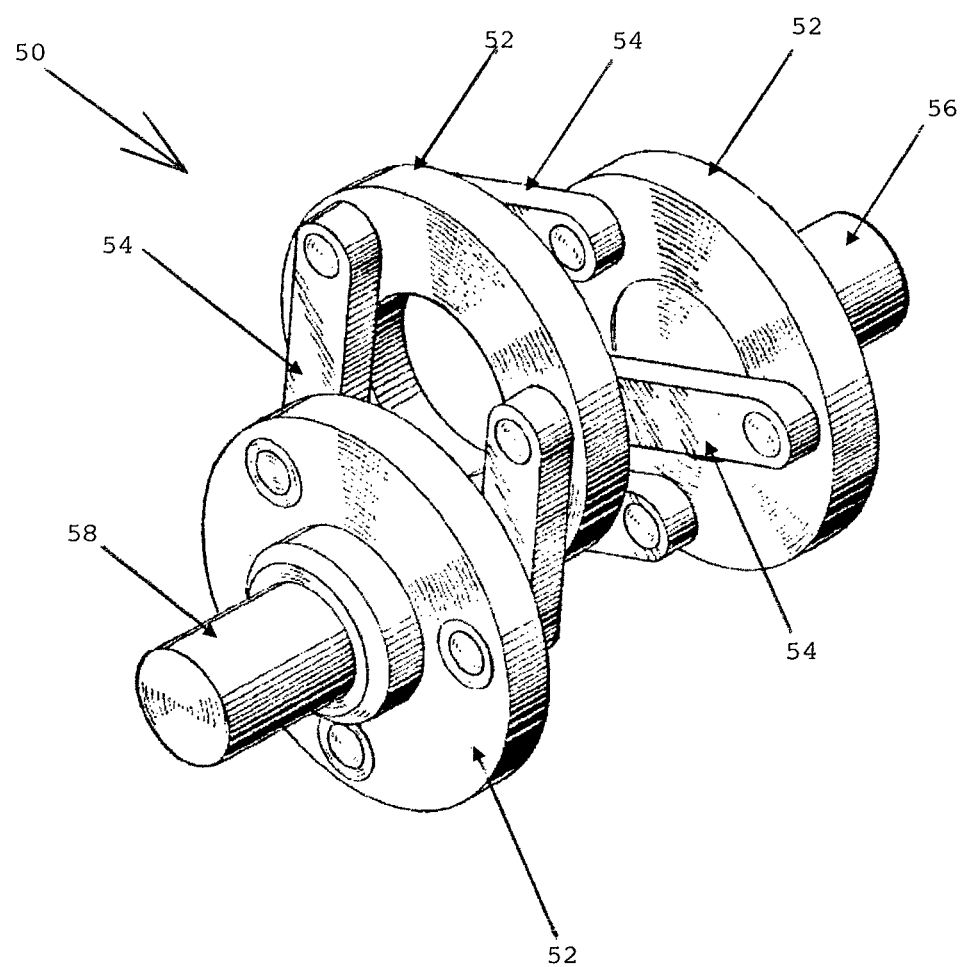
FIG. 8 is a perspective view of a Schmidt coupling.

In FIG. 8, there is shown a perspective view of a Schmidt coupling 50 having three disks 52 connected by pivotal links 54 with an input shaft 56 at one end and an output shaft 58 at an opposite end. Schmidt couplings are conventional and allow an input shaft to drive an output shaft when the two shafts are out of alignment and when the two shafts are in alignment with one another. With the present invention, the wheels preferably have tires thereon and the tires wear with usage. Therefore, the alignment of the input shaft to the Schmidt coupling from the wheel will change with time. The Schmidt coupling will automatically adjust for changes in alignment to drive the output shaft which is connected to drive the generator. There are other means of coupling the output shaft from the wheels to the input shaft of the generator to adjust for changes in the alignment. The wheels are mounted using an adjustable loading mechanism to apply pressure to the track using springs, pneumatics and/or hydraulics.

Each wind turbine is designed with an optimum tip speed ratio and a controller is preferably connected and programmed to operate the wind turbine substantially at the optimum tip speed ratio for wind speeds ranging from 3 meters per second to 25 meters per second and more preferably from wind speeds from 4 meters per second to 25 meters per second. Tip speed ratio is equal to tip speed of a blade divided by wind speed. While the generators can be of a type that do not generate electricity, electric generators are preferred.

The wind turbine drive system manages the torque transmitted through the mechanism such that torque above design levels and rates of change of torque above design levels are not achieved. A number of features will be used to achieve torque management. These include the following:

The variable speed rotor and generator operation allows wind energy to be stored in the rotating components. For modern wind turbines, the rotating blades represent the major rotating inertia. By allowing energy from wind gusts to be temporarily stored in the kinetic energy of the rotating blades, the variations in torque seen by the mechanical drive train are reduced. There is an upper limit to the average wind speed over time above which the wind turbine is shut down. However, for variable speed machines energy storage by such means can be almost instantaneous.

Pitch control of the wind turbine blades allows the optimization of the pitch angle of the blade to accommodate changes in wind speed in order to collect the optimum power at that speed. Pitch control also allows the reduction of the power capability of the rotor as wind speed increases. Pitch control is relatively rapid. However, gusts can occur faster than the pitch control can respond. During a gust interval when wind speed is changing faster than the pitch control can keep pace, other controls manage the torque to maintain design levels. Inertial energy storage is sufficient to allow all excess power from a wind gust to be stored in inertia during the mismatch.

Power Electronics (PE) allows the system to operate with variable speed generation yet deliver synchronized power to a grid (optionally 60 Hz or 50 Hz depending on location). The PE also allows the generators to be synchronized to a grid that has additional generators. Further, the PE assists in managing the torque on the mechanical drive system by controlling the load on the generator (and back torque). PE controls are very fast and, for example, can react within a few cycles (16 ms/cycle for 60 Hz). The PE controls recognize the current state of the wind turbine machine (its inertia, the pitch setting, and the wind speed) and control the electrical power production to help control the torque in the wind turbine.

Multiple small generators allow wide range electrical power production at relatively high efficiency. For example, a 1.5 MW wind turbine with six generators, each with 250 KW capacity, could operate at the 250 KW power level in low wind with a single generator functioning at full rated power, which is also its best efficiency point. As wind speed increases, additional generators are brought into service, maintaining an overall high generating efficiency over a wide range of wind speed. Bringing additional generators on line as the average wind speed increases assists in managing the average torque seen by the mechanical drives. As wind speed decreases, one or more generators are removed from generating so that a minimum number of generators are preferably generating corresponding to the average wind speed over time.

A friction coupled drive with the wheels rotating in contact with the track allows torque peaks to be avoided by slippage between the friction components when torque exceeds a prescribed level. Mechanical power is dissipated by friction heating during slippage as the wheels slip on the track. This represents a loss of efficiency, but also represents a safety limit. A gust driven torque not managed by the above controls is dissipated by friction heating when the slippage occurs. This safety system is instantaneous, but does not occur unless a large torque overload occurs. The friction safety feature is not used as a regular control feature because of energy dissipation, associated wear of the friction components, and loss of efficiency. Also, this feature allows each unit of generating equipment to operate independently (independent load paths); hence one unit (for example, one generator) of the generating equipment can fail without affecting the availability of the other units of generating equipment.

The drive system is preferably a simple mechanical drive train incorporating friction mechanical power transmission components to provide the required ultimate torque limitation; preferably multiple permanent magnet generators allow relatively slow speeds, variable speed operation, and operation at high generator efficiencies (other types of electrical generators, for example, induction, or doubly fed directly driven by the friction mechanical power transmission or through a small gear box); and power electronics to handle the variable alternating current produced and to manage wind turbine drive train torque.

As shown in the FIG. 1, the system preferably has the following systems and components:
Wind turbine Drive
Main shaft and bearings
Friction Drive Mechanical Components
   Drivewheel
   Tires
   Tires Carrier
   Tire Loading Mechanism
Tire-to-Generator Link
Main Brake (including brake hydraulic control system)
Generator and Generator Cooling System
Power Electronics
Control System
Data Acquisition System
Balance of WT System:
Rotor (including tip brakes and pitch system if applicable)
Yaw System (including yaw bearing, brake, motor and controls)
Nacelle (including base plate, jib crane, access platform and enclosure)
Tower and foundation
Electrical Systems (including Motor Control Center, UPS, main disconnect, and connection to grid)

Variations can be made in the wind turbine. For example, the friction drivewheel can be located immediately behind the rotor and the friction drives (for example, wheels) with the electrical generators located to the inside of the nacelle as shown in FIG. 2. This layout will reduce the number of bearings required and the brake system will be mounted on the back end of the main shaft.

The number of friction drives can be increased or decreased to meet the required rated power and the specifications of the electrical generators.

The main shaft and bearings provide support for the rotor and deliver torque from the rotor to the remainder of the mechanical drive. The main shaft also provides a torque path from the main brake disk and calliper to the rotating components such as the rotor and the drivewheel.

The main brake is provided to stop and secure the rotor and drive train. The brake system is preferably located on the slow speed shaft 4 in order to reduce the braking effect on the power generation components. The brake system can be installed on the high speed shafts of the power generating components, but that would expose the power generating components to torque excursions during braking.

The main brake shall stop the rotor in few seconds under any non-operational wind conditions (For example: operational wind speeds are 4 to 25 m/s in one model, 2 m/s to 50 m/s in another model and 3 to 25 m/s in yet another model) and under any generator fault conditions. In any type of emergency, the brake system will be activated to bring the turbine to a safe stop. Several emergency stop buttons are provided to allow the operator/service personnel to stop the wind turbine safely in case of emergency or when performing maintenance on the turbine.

The design utilizes a hydraulically released, spring actuated system for the main brake. But other types of brake systems can also be used, for example, hydraulic, pneumatic, mechanical, or electric brakes. This approach was selected to provide the required braking and to minimize the requirements placed on the wind turbine start up power supply by the main brake system.

The hydraulic system for the main brake includes a pump and accumulator to maintain system pressure and to ensure that the system is pressurized when the wind turbine is in standby. The brake will be spring loaded to close on loss of control power or loss of hydraulic pressure. Actuation of a solenoid valve in the hydraulic system will allow hydraulic pressure to release the brake. A separate control valve will be provided. By controlling the control valve position, the system hydraulic pressure and thus the brake pressure (and energy dissipated by the brake) can be varied. The brake system can be used as means to control the energy provided to the power generating components.

The brake disk is located on the main shaft. From a maintenance perspective, it would be preferable to locate the brake disk outboard of the drivewheel, so that it could be removed easily for maintenance. As mentioned above, the brake system can also be located on the high speed shafts. The brake caliper and hydraulic actuation system will be supported from the Nacelle baseplate.

The friction drive uses a drivewheel or racetrack directly driven by the main shaft of the wind turbine. The drivewheel therefore rotates at the same speed as the wind turbine rotor. The drivewheel can be designed to have a different layout with tires running on both the inside and outside of the track, or on the outside of the track. Also it is possible to have the drivewheel designed so that the tires are running perpendicular to it and no track parallel to the longitudinal axis of the shaft 4 is required. The drivewheel is made of carbon steel, stainless steel, or any suitable engineering material. The drivewheel can be designed to be manufactured as a weldment from metal sections, as a casting, or built-up as with fiber reinforced composite materials. The tires ride on the drivewheel. The drivewheel and tire combination are sized to achieve a rotational speed increase that is required to increase the speed of the wind turbine to rotor to that of the electrical generator. While the wheels are preferably tires, other wheel designs can be used including wheels having sprockets that fit into suitable openings in the track. When wheels with sprockets are used no slippage will occur and slippage under certain conditions is preferred.

Tires are used to transmit power from the drivewheel to the generators. Other means that use friction can be used to transmit the power from the drivewheel to the generators like metal wheels. The friction coupling is between the Drivewheel and the 'Tires.' Tires are used to provide friction drive coupling in many wheeled and powered vehicles.

The tires will skid under extreme torque loads (torque loads that exceed the tire normal loading times the coefficient of friction between the tire and the drivewheel). Skidding is an upset condition. Skidding is not expected, except for extreme overload conditions. By controlling the generator load, restoration of rolling after a skidding event is possible. During skidding, some tire wear is expected, but failure of the tire is not expected. The tires are preferably solid tires (i.e. without air).

The tires are secured in a "Tire Carrier" which maintains tire alignment and provides support to the tire axle. The carrier will hold the tire wheel shaft, its bearings (one of which must be a thrust bearing to hold the shaft in place), and the spring socket. (See FIG. 5).

The tire carrier can be designed to support more than one tire if required to transmit greater torque. The tire carrier will be hinged up-rotation from the contact point and will be supported by a structure that reacts the loads to the nacelle baseplate. Alternatively, a tire carrier can be employed in the form of a C-clamp by pinching the drivewheel between two tires, one rolling on the inner track and one rolling on the outer track.

A retraction and travel limit link will limit the travel of the wheel if the tire fails and will allow retraction of the wheel for maintenance. The tire carrier will permit sufficient travel so the tires will remain in contact with the drivewheel account for tire wear, thermal growth due to seasonal temperature variations, and manufacturing tolerances of the drivewheel.

The tires are engaged with the drivewheel and are loaded at all times. Power electronics are used to load and unload the generators by controlling an on/off switch with the tires engaged with the drivewheel at all times. This eliminates the skidding of the tires that would occur during initial contact between the tire and drivewheel if the tires were engaged only when required to provide power to their respective electrical generators.

The tire loading mechanism ensures that adequate load is maintained on the tire during the range of conditions which are likely to be seen during normal operation.

The impact of thermal expansion, tire wear, drivewheel run out, and drivewheel deflection on the effective tire load are preferably all taken into account. In addition, as discussed above, the loading mechanism must provide sufficient margin to account for the range of friction coefficients that are likely to be seen in service. The design of the loading mechanism is such that frequent adjustments of the loading mechanism are not required.

The generators are preferably driven directly by the tire shafts at tire rotation speed. (It is possible to use a small gearbox between the tire shaft and the generator shaft to increase the speed to that required by the generator, but the use of a small generator is not permitted.) However, while the generator is anchored to the nacelle base plate, the shaft of the wheel and tire must be free to travel radially relative to the drivewheel center. (The tire must be free to travel radially in order to maintain the required contact force with the drivewheel while accounting for drivewheel run-out, thermal expansion, tire wear etc.).

By way of example, four (4) permanent magnet (PM) fluid-cooled generators (other types of electrical generators can also be used like permanent magnet air-cooled, induction, and doubly fed induction. Also, the number of generators used can be more or less than specified for this example depending on the rated electrical power desired for the wind turbine) arranged around the main shaft, directly driven by the tires of the friction drive. Fluid cooled permanent magnet generators are preferred because they are smaller and less expensive than air-cooled permanent magnet generators.

The generators are constantly rotating whenever the wind turbine conditions are within the predetermined operating range because the friction drive tires are constantly engaged. However, the generators are not constantly loaded. Rather, the Power Electronics System will load generators consistent with the available wind power and so as to manage the torque on the drive train. The drivewheel will be subjected to constant radial loads and varying torque as generators are loaded.

Multiple small generators offer relatively high efficiency over a wide range of operation including the occasional generator out of service condition. Large generators have good efficiency over a wide range of operation but they represent a single point of failure when sized to handle the full power of the wind turbine. The use of multiple small generators provides operational reliability by reducing the consequence of any single failure to that fraction of the full power represented by a single generator. Wind farms achieve this protection against equipment failure by using a large number of wind turbines. The drive system achieves redundancy by incorporating multiple generators in one nacelle. The multiple small generators are preferably controlled to operate only at or near their full power for all wind speeds within the design range. This means that the generators will be operated at or near their greatest efficiency point.

The fluid-cooled generators require a cooler subsystem to remove and dissipate the power lost due to generator inefficiency.

The cooler subsystem is a combined system with a single loop, not individual cooler systems for each generator. The nacelle cover (not shown) provides the necessary ventilation to support the heat dissipation for the cooler system. For low design temperatures, a propylene glycol and water coolant fluid is used to prevent freezing.

The fluid-cooled systems require heat exchangers to remove the heat generated by the inefficiencies of the generators, pumps to move the fluid, and simple controls and interlocks to ensure proper operation. If using air cooled PM, induction, or doubly-fed generators, the use of a cooling system can be eliminated, The nacelle cover must be designed to provide the necessary ventilation to dissipate the power lost due to generator inefficiency.

A Power Electronics System is used to provide the following capabilities:
  Manage generator torque and speed; control of generator load allows the generator back torque on the drive train to be managed,
  Convert the variable frequency power provided by the generators to 60 Hz AC synchronized to a grid power, and
  Control the reactive power provided by generator.
  Power electronics are provided to separately control the output from each generator, or to control any number of the generators together.

The power electronics (PE) consists of several discrete elements (see FIG. 5): a rectifier, a DC link, and an inverter. The rectifier converts the variable AC voltage produced by the generators into a DC voltage (i.e. the DC link voltage). The DC link provides steady DC voltage to the inverter. The inverter creates a 60 Hz, 3φ voltage (or current) that can be synchronized to the grid or fed to an isolated bus.

The control system comprises a PLC I/O panel and DAS panel mounted in the Nacelle, a Drive Control Panel mounted in the base of the tower and a visualization computer in the site control building. The PLC I/O panel is to contain all of the I/O required to control the wind turbine along with the motor starters for the fixed speed motors. The drive panel will contain the main VAC incoming power and the Sinamics drive line-up. A standard desktop PC is mounted remotely to control/monitor the operation of the control system via wireless Ethernet link to the PLC and Data Acquisition Computer. Preferably, remote desktop function on the HMI (Human Machine Interface) computer will be activated to allow full remote access through the Internet from a computer, Pocket PC or Smart phone or other electronic access device by authorized personnel. Preferably, the hard wired firewall will restrict access to the ethernet network to those who have logged into the network with a valid Virtual Private Network (VPN) login.

PM Generator Torque and Speed

The frequency of the voltage produced by the PM generator is directly proportional to generator speed. The generator speed depends on both the wind turbine power and the electrical load on the generator. At steady state, the torque provided to the generator from the friction drive is equal to the back torque provided by the generator (i.e. the power available to drive the wind turbine is equal to the power being extracted from the system by the generator). However, during wind or load transients, these torques will not balance and the wind turbine rotational speed will vary.

For example, if the wind turbine is operating at 50% load and the wind speed increases, the wind turbine and generator speed will start to increase. Since there is more wind power available, the PE will react to provide additional power to the grid and the wind turbine speed will stabilize. By controlling the rate at which the PE brings the system into balance, the PE system can manage the torque excursions seen by the wind turbine drive system.

Frequency, Voltage and Reactive Power Control

The voltage produced by the PM generator depends on both the generator speed and electrical load. Therefore, during wind or load transients, the generator output voltage magnitude also will vary. To account for varying generator voltage and frequency, a controlled rectifier is used to covert the varying AC voltage to a steady DC voltage (i.e., the DC link). The DC link provides a voltage to a controlled inverter.

The inverter provides a controlled, 60 Hz, three-phase voltage to the power grid or an isolated power system. The overall control scheme for the PE will depend on whether the unit is providing power to an electrical grid (i.e., infinite bus) or a local, isolated (or islanded) power system. When paralleled to an electrical grid, the PE can control the real and reactive power provided to the grid. The real power provided to the grid will determine the electrical load (i.e., torque) developed by the generator.

When the wind turbine is operated on an isolated power system (i.e., the wind turbine is the only generator providing power to the system), the PE controls have to maintain bus voltage and frequency while following the power demanded by the loads on the system. Since the PE cannot directly control the power demanded by the loads, other control elements are needed. Wind turbine mechanical controls can still be used to control the power drawn from the wind (pitch, yaw or main brake). Other load controls may also be necessary or desirable. For example, there may be a need to have a resistive load bank to "dump" excess power, if the wind suddenly gusts or the electrical system load suddenly changes (e.g., a significant electrical load trips). Likewise, if the electrical system load increases beyond the available wind power, there may be a need for load shedding control.

The design of the principal PE hardware is provided below.

Rectifier

The rectifier includes a regenerative feedback Active Front End (AFE) which is a self-commutated, actively controlled line converter that ensures an especially high line supply quality.

The Active Front End is a special feature which offers considerable benefits especially for wind turbines. The AFE generates a line-friendly sinusoidal current almost free of any harmonics. This is achieved by combining intelligent switching characteristics and an integrated Clean Power filter. Further, the AFE switching principle allows line supply voltage fluctuations to be actively compensated and produces a high control dynamic performance.

The AFE permits inductive reactive power to be generated so that the power factor can be influenced by the line-side converter.

Inverter commutation faults cannot occur when generating due to the self-commutated mode of operation of the AFE.

DC Link

Fully digital voltage DC link drive inverters operate with high precision, are reliable, and are efficient.

Inverter

The inverter units are rated for 45 to 10,000 KW, 460, 575, or 690 VAC operation, equipped with low loss power IGBT's (Insulated Gate Bipolar Transistors) and microprocessor controlled vector regulators. The inverters will provide generator control and protection functions. (The generator may be provided with encoder and thermal sensors for RPM feedback and thermal measurement and overload protection.)

The wind turbine is provided with the following control subsystems:
  Normal Operating Controls (Startup, Operation, and Shutdown),
  Safety Systems (for example: emergency shutdown, system interlocks for maintenance access),
  Yaw Control, and
  Pitch Control.

The control system is preferably provided with power from an uninterruptible power supply (UPS) with sufficient capacity to support the startup of the wind turbine for islanded applications. The UPS will also protect the control system from disruptions due to variations in power quality.

The control system preferably includes the capability to monitor and record selected system parameters. However, alternating the monitoring of system parameters will be handled by a Data Acquisition System (DAS).

Start-up Sequence

The wind turbine is designed to operate in either grid connected or isolated power systems. The start-up sequence is designed so that both applications can be accommodated with one sequence.

The wind turbine will be allowed to start when wind speed is preferably between 4 m/s~25 m/s as follows:
  Activate the yaw control system and release the brake on the rotor
  Activate the pitch mechanism to rotate the blades to the power position that corresponds to the wind speed.
  Wait until the rotor speed is greater than minimum operating speed of the turbine and then start generating
  Depending on the measured wind velocity, 1 to n of the generators will be brought online with a regulated torque control scheme (n can be any number of generators, for example the 1.5 MW WT can use six generators each with rated power of 250 KW). The least used offline generator will be used at each stage to ensure that the generators are used equally over time. The only exception to this is that the second generator brought online will always be diametrically opposite to the first
  The AFE starts to regenerate into the AC power system at a regulated frequency and voltage.
  10 seconds after generation begins the coolant pump is started if using the water cooled electrical generator.
  Preferably the operating range of wind speed is based on average wind speed over a pre-determined time period.

Normal Operating Controls

During normal operation, all the generators are brought online/offline as the available kinetic energy varies from the wind turbine. The generators operate from minimum speed up to maximum speed (the minimum and maximum speeds will be determined based on rotor size and design) with a certain allowed over speed during wind gusts. The torque is regulated so that the rubber wheels (tires) do not slip on the drivewheel. The wheels may slip during sudden and extreme gusts but this is only a backup method of regulating the applied torque to the generators. The auxiliary systems such as the hydraulic pump, the generator cooling system pump, and the cooler fan are brought into service as required by operation of the wind turbine.

Shut Down Sequence

During normal operation when the wind speed is greater than 25 m/s or less than 4 m/s for a ten minute average then the wind turbine will be shut down. The pitch mechanism will turn the blades to a position were the energy collected from wind will be reduced to minimum. The brake is applied and the AFE stops generating. The main drive contactor remains closed during a normal stop. The coolant system, the hydraulic pump and the yaw motor are also stopped at the beginning of the shut down sequence.

Generator Control

As discussed above, the Power Electronics System provides control of the generator load and speed. The system manages the torque on the drive train during transients and match generator load to available wind power. The main drive contactor remains closed during normal stops but is opened during an emergency stop or when a grid connection fault has occurred.

The following safety actuations may be provided in the design to ensure safe operation and shutdown in the event of machine failures, excessive wind, or other operational situations:

Manual engagement of the main brake
Centrifugally actuated aerodynamic rotor tip brakes
Yaw brake
Yaw out of the wind direction during survival wind speeds
Pitch system actuation to reduce or eliminate the extraction of power from the wind
Automatic engagement of the main brake upon any of the following:
Loss of AC power
Rotor overspeed
Main grid (or load bank) trip
Excess vibration
Wind speed above normal operating range (ten-minute average)
Yaw control deemed ineffective (yaw mismatch exceeds limit)
Reset yaw rotation (yaw wound up the internal cables and they need to be unwound)
Low coolant (generator coolant level)
Low hydraulic fluid (for hydraulically released brakes)

The safety aspects of the main brake control are as follows. Remote manual application of the main brake is required. The brake should be capable of being applied from the control station, from inside the tower at the base, and at the exit door at the tower top. If the brake is not applied prior to a service technician working at or near the nacelle, provisions are required to ensure the technician can feel safe. Automatic actuation of the main brake will be triggered by any of several upset conditions as noted above.

The Yaw drive mechanism is used to turn the nacelle into the wind. The yaw drive acts as the yaw brake through the high gear ratio of an AC gear motor of the yaw drive, or a separate yaw brake system can be used to provide the necessary braking force to keep the turbine nacelle directed into the wind.

The orientation of the nacelle and the direction of the wind is preferably measured and tracked. The mismatch between them is controlled within 10° on a ten minute wind direction rolling average. (Sampled every 5 seconds.)

To prevent the internal cables from wind-up, the nacelle is allowed to be turned 1080° (3 full revolutions) to both directions from neutral position. If the wind changes direction in a consistent manner and wind-up occurs, the wind turbine will shut down and the yaw system will approach the match position in the unwinding direction and the final position should be within ±180° of the neutral position. Only then can the wind turbine be put back into service.

"Yaw Maintenance Position Port" and "Starboard" limit switches are used to orient the nacelle for maintenance purposes in the present model wind turbine. When these modes are selected, the yaw motor will move in the unwind direction until the desired limit switch is reached. Once the maintenance door in the tower is opened, the yaw control will be disabled completely.

A closed loop controller (software based) is used to automatically adjust the operational state of the turbine in order to keep it on a pre-defined operating curve, this will include:

Controlling the blade pitch to accommodate free stream wind velocity providing optimum pitch angle to deliver optimum power.
Controlling the blade pitch to regulate the power output of the turbine to the rated level in winds with greater than rated wind speed.
Controlling the blade pitch to follow a predetermined speed ramp during start-up or shut-down of the turbine.
Controlling the loading of generators using electronic circuits, providing a means of step-up or step-down with power generated accommodating variable wind speed by electrically loading and unloading of generators.

Data Sampling

The data acquisition system will read and record wind turbine control system and drive operating parameters. Data is continuously sampled and recorded upon changes in state.

The system shall have the capability for the operator to select the frequency at which the instruments will be sampled and data recorded. In general, data will be recorded at up to one second intervals (estimated data load is 50 MB per day or 20 GB per year). In addition, the system shall have the capability to record selected parameters at much higher frequencies.

Data Transfer

The data acquisition system has high-speed data transmission capability (broadband or wireless DSL) to transmit data to the engineering team. The data program stores the data locally and transmits data daily. Provisions are made to store all data not yet transmitted if a data link failure occurs.

In addition, the data program shall have the capability to allow key parameters to be monitored in near real time.

Data and Monitoring

Basic engineering tools (e.g. spreadsheets or other data displays) are provided for use in monitoring the wind turbine and interpreting the data provided by the DAS during operation.

Power Supply

The DAS is provided with power from an uninterruptible power supply with sufficient capacity to allow the data to be saved following a wind turbine trip. The UPS protects the control system from disruptions due to variations in power quality.

A list of the instrumentation to be preferably provided in the wind turbine and be preferably monitored with the Controls System or DAS is provided below.

Weather
Wind speed
Wind direction
Relative humidity
Ambient temperature
Barometric pressure
precipitation
Wind Turbine
Pitch angle
Yaw angle (to neutral yaw position) (±3 full turns)

Rotor speed
Tire speed (nx)
Tire load (load cell) (nx)
Tire temperature (nx)
Main brake release pressure
Drivewheel vibration
Generator shaft vibration (nx)
Rotor vibration
Yaw brake position
Tower vibration (seismic type sensor)
Nacelle internal temperature
Power
Individual generator temperatures (nx)
Individual generator voltage (nx)
Individual generator current (nx)
Power electronics voltage out (nx)
PE reactive power factor or current (nx)
PE frequency (nx)
PE intermediate voltage (DC) (nx)
Power
VARs—Variables?
Grid
Coolant
Flow
Level
Temperature
Pressure
Brake Hydraulics
Pressure
Level
Temperature Where 'n' is a number for a particular component:

A crane capable of raising, lowering, and moving the heaviest field replaceable component in the nacelle is provided inside the nacelle. A PM generator or the drivewheel track are the heaviest components identified. The lift range is from the ground to the components location in the nacelle. The vertical lift will be on the order of the hub height above the tower base.

The crane can be manually or electrically operated. Electrical operation is not possible without external power such as a portable generator or the local grid because no general site power is available when the wind turbine is not operating (and the crane cannot be used when the wind turbine is operating).

The tower provides elevation and support of the wind turbine. It also provides shelter and mounting for the various controls power electronics, DAS, and electrical systems. The internal diameter at the base of the tower is sufficient for the installation of the PE, Control Panel, DAS, and motor control center within the tower.

The foundation will be a reinforced concrete, soil overburden weighted structure. It will react the forces and moments delivered to the wind turbine for all survivable wind speeds.

Electricity can be supplied to the generators and the controller can be programmed to operate the generators as motors in order to start up the wind turbine in low wind conditions, when the wind speed is not sufficient to overcome the initial inertia required to rotate the blades. In low wind conditions, where the wind speed is not sufficient to exceed the force required to commence rotation of the blades, but is sufficient to keep the blades rotating after the rotation is started by mechanical means, a benefit can be derived by using electricity to commence the rotation. After the rotation is commenced and the rotor (and blades) are rotating at a speed that is within the normal operating range, the controller cuts off the electricity being supplied to the generators to operate the generators as motors, and the generators can again be used as generators to be powered by the wind energy that keeps the blades rotating, and generates electricity through the generators. If the wind is not sufficient to maintain the operation of the wind turbine subsequent to the rotation being started by using the generators as motors, the turbine will simply stop rotating when the electricity to the generators has been cut off by the controller. For example, a two megawatt wind turbine is capable of self-starting without going into the motor mode at a wind speed of four meters per second, which provides enough energy from the wind to overcome the initial inertia required to commence rotation of the blades. If the wind speed is three meters per second and that wind speed is not sufficient to commence rotation of the blades, but is sufficient to maintain rotation if the blades are already rotating, then when the rotation of the blades is commenced using the generators operating as motors, the three meter per second wind speed will be sufficient to maintain the rotation of the blades after the electricity supplied to the generators has been cut off and as long as the wind speed continues at, or greater than, that speed, the blades will continue to rotate and will generate electricity through the generators. This method allows the turbine to generate electricity at lower wind speeds than would otherwise be possible.

The generators can be used as an electrical break with up to 150% torque demand that is designed into the generators. The controller can be programmed to stop the generators from rotating, this in turn will stop the rotor from rotating. The torque demand need only be exercised for a few seconds to stop the turbine. The controller will remove the torque demand when the rotor speed is zero. The electronic break adds another safety feature to the turbine in case the main break fails. For example, for a two megawatt wind turbine, the electrical generators are rated for two megawatts, and the blades are also designed to deliver two megawatts of power. By placing a 150% torque demand on the generators for a short period of time, the breaking capability of the turbine will increase to three megawatts, which is adequate to stop the turbine from rotating.

In a further embodiment, the generators can be designed to operate at higher than their rated load to accommodate wind gusts that occur beyond the normal operating range of the turbine. For example, the generators can be designed to withstand a torque demand of 120% above the rated load in order to control the rotor speed and avoid over-speeding caused by a wind speed that is temporarily above the normal speed range of the turbine. The controller is programmed to allow a torque demand of 120% from the electrical generators when the rotor speed exceeds a predetermined set value, or the rate of ramp-up of the rotor speed exceeds a predetermined set value. The torque demand is applied for only a few seconds and the controller will track the rotor speed. If any of the tires driving the electrical generators experience slip, then the torque demand will be reduced in half by the controller. For example, a two megawatt wind turbine is equipped with a pitch mechanism that will adjust the blade angle to correspond to the wind free stream speed controlling the amount of power extracted from the wind. Wind gusts can occur without warning, and the wind speed can increase more quickly than the pitch system is capable of responding. The two megawatt wind turbine will have the capability to operate up to 2.4 megawatts (120% torque demand) for a short period of time to overcome the wind gust, thereby allowing time for the response of the pitch mechanism. In still a further embodiment, the electrical generators can be designed for operating with a 150% torque demand for a short period of time to accommodate wind gusts.

FIG. 3 is a schematic view. The blades of an actual turbine have a circumference through the tips of the blades with a diameter that is much larger than a diameter of the track.

We claim:

1. A wind turbine comprising a plurality of blades mounted on a rotor, said rotor having a rotatable shaft with a drivewheel extending outward therefrom, said drivewheel rotating with said shaft and said rotor as said blades rotate in response to a wind speed, said rotor having a broad range of speed, a plurality of-wheels being ha continuous rotatable contact with said drivewheel, said wheels being connected to drive a plurality of generators to produce energy, said turbine having various means for controlling a speed of said blades comprising at least two selected from the group of pitch, yaw and brakes, a controller being connected to control the number of generators that are generating between zero and all of said generators based on the speed of said blades, while controlling at least two of said pitch, yaw and brakes and monitoring parameters relating to said speed of said blades, said controller being programmed to add or remove the number of generators generating based on a torque of said rotatable shaft.

2. A wind turbine as claimed in claim 1 wherein said controller is connected to control the number of generators that are generating by switching each generator on or off, said controller being connected to monitor several parameters comprising wind speed, wind direction, yaw position, pitch position, blade speed, rotor speed and time.

3. A wind turbine as claimed in claim 2 wherein said drivewheel has a track around a periphery thereof and said wheels are in contact with said track.

4. A wind turbine as claimed in claim 3 wherein said track extends substantially parallel to a surface of said shaft.

5. A wind turbine as claimed in claim 3 wherein the said controller is connected to cause one generator of said plurality of generators, to generate when said rotor is rotating at a minimum average rotor speed and several generators of said plurality of generators to generate when said rotor is rotating at to maximum rotor speed.

6. A wind turbine as claimed in claim 2 wherein said controller is connected to add and remove generators that are generating as a rotor speed increases and decreases respectively within an operating range above and below predetermined levels respectively for each number of generators that are generating.

7. A wind turbine as claimed in claim 6 wherein said controller is programmed and connected to shut down said turbine when said average rotor speed is outside of said operating range for a predetermined time.

8. A wind turbine as claimed in claim 6 wherein said average rotor speed is determined for at least one minute of time and said controller is connected to shut down said turbine whenever said average rotor speed is outside said operating range.

9. A wind turbine as claimed in claim 6 wherein there are at least four generators, said four generators being connected to enable said controller to switch said generators on and off individually and to operate any number of generators in a generating mode based on an average rotor speed.

10. A wind turbine as claimed in claim 9 wherein said generators generate electricity.

11. A wind turbine as claimed in claim 1 wherein said wind turbine has an optimum tip speed ratio, said controller being connected and programmed to operate said wind turbine substantially at said optimum tip speed ratio for speeds ranging from five meters per second to twenty-five meters per second.

12. A wind turbine as claimed in claim 1 wherein each generator has a size that is substantially less than the maximum output of said wind turbine, said plurality of generators having a total size that is capable of handling the maximum power output of said turbine.

13. A wind turbine as claimed in claim 1 wherein said controller is a programmable logic controller.

14. A wind turbine as claimed in claim 1 wherein said controller is a power electronic controller that can adjust at least one of pitch, yaw and brakes within seconds of detecting a change in parameters being monitored.

15. A wind turbine as claimed in claim 14 wherein said power electronic controller comprises a rectifier, a DC link and an inverter, said rectifier being connected to convert variable AC voltage produced by the generators into a DC voltage, said DC link being connected to provide steady DC voltage to said inverter, said inverter creating a three phased voltage or current of a frequency that can be synchronized to the grid or fed to an isolated bus.

16. A wind turbine as claimed in claim 15 wherein said current is one of 60 Hz AC and 50 Hz AC.

17. A wind turbine as claimed in claim 1 wherein said controller is an electronic controller.

18. A wind turbine as claimed in claim 1 wherein said controller is a power electronics system that is capable of at least one of the following:
   (a) managing generator torque and speed;
   (b) controlling a load of each generator and managing generator back torque on a drive train of said turbine;
   (c) converting variable frequency power provided by the generators to sixty Hz AC synchronized to grid power;
   (d) controlling reactive power provided by the generators;
   (e) controlling an output from each generator;
   (f) controlling an output from any number of generators together.

19. A wind turbine as claimed in claim 1 wherein said controller is a power electronic system that is capable of the following:
   (a) managing generator torque and speed;
   (b) controlling a load of each generator and managing generator back torque on a drive train of said turbine;
   (c) converting variable frequency power provided by the generators to sixty Hz AC synchronized to grid power;
   (d) controlling reactive power provided by the generators;
   (e) controlling an output from each generator;
   (f) controlling an output from any number of generators together.

20. A wind turbine as claimed in claim 1 wherein there is a data acquisition system for obtaining and recording operating parameters of said turbine and wind and weather conditions.

21. A turbine as claimed in any one of claims 1, 2 and 3 wherein said drivewheel has a significantly smaller diameter than a diameter of the blades.

22. A method of operating a wind turbine, said wind turbine comprising a plurality of blades mounted on a hub to form a rotor, rotor being mounted on a shaft with a drivewheel thereon, a plurality of wheels being in rotatable contact with said drivewheel, said wheel being connected to drive a plurality of generators to produce electricity, said turbine having various means for controlling the speed of said rotor comprising of at least two selected from the group of pitch control, yaw control and brakes, a controller being connected to control the number of generators that are generating based on the speed of said rotor, said method comprising programming controller to monitor wind speed, wind direction, rotor speed, yaw direction, one of brakes and pitch, number of generators, number of generators currently generating, torque of rotor shaft, said method comprising commencing with start up, said controller releasing the rotor to accelerate when an average wind speed is within an operating range over a predetermined minimum time period, when said rotor reaches a minimum speed required, said controller placing a load on a first generator, said controller phasing in additional generators when a torque of said rotor shaft times a total number of generators divided by a number of active generators is greater than a predetermined minimum torque for phasing in an additional generator, stud controller phasing out one generator when a torque of said rotor shaft times the total number of generators divided by a number of active generators is less than a predetermined minimum torque required for phasing out one generator, said controller phasing in and phasing out generators as required depending on the torque of said rotor shaft and the number of generators generating, said controller phasing out a last active generator when said torque of said rotor shaft is below a predetermined minimum to operate one generator and stopping the rotor and generators, and said controller stopping said rotor and phasing out all generators when an average wind speed over a predetermined time is greater than a maximum predetermined wind speed, said controller placing a load on additional generators as said wind speed increases within said operating range and removing said load from additional generators as said wind speed decreases within said operating range, said controller operating said wind turbine to generate energy in a broad range from a minimum rotor speed required to operate one generator to a maximum rotor speed required to operate all generators.

23. A method as claimed in claim 22 including the steps of connecting and programming the controller to cause one additional generator generate when a multiple of torque requested from said shaft times a total number of generators divided by a number of generators currently generating is greater than 95% of a predetermined torque set point value and one generator is removed from the generators generating when torque requested from said shaft times the total number of generators divided by the number of generators generating is less than 90% of said predetermined torque set point value.

24. A method as claimed in claim 22 including the step of operating the turbine to temporarily store kinetic energy in the rotating blades.

25. A method as claimed in claim 22 wherein said controller is a power electronics system, said method including the steps of operating said turbine with variable speed generator yet deliver synchronized power to a grid.

26. A method as claimed in claim 22 including the steps of controlling the yaw and pitch to increase the speed of the rotor to operate the wind turbine at the highest rate of speed possible based on the wind conditions to produce as much power as possible within an operating range of the and turbine.

27. A method as claimed in claim 22 wherein said method comprising operating said wind turbine at a variable speed over a broad range, said generators producing AC current at a variation of frequencies, using power electronics to connect said AC current to a final product AC currant at a substantially constant frequency, feeding said final product AC current to a grid.

28. A method of operating a wind turbine, said wind turbine comprising a plurality of blades mounted on a hub to form a rotor, said rotor being mounted on a shaft, said shaft having a drivewheel thereon, a plurality of wheels being in rotatable contact with said drivewheel, said wheels being connected to drive a plurality of generators to produce electricity, said turbine having various means for controlling the speed of said rotor, said method comprising connecting a controller to monitor several parameters relating to wind speed, wind direction and speed of said drivewheel, programming said controller to adjust one or more of yaw, pitch, brakes and to adjust number of generators generating in response to changes in one or more of said parameters, programming said controller to adjust any two of yaw, pitch and brakes to control the speed of said drivewheel and programming said controller to increase and decrease a number of generators generating as said speed of said drivewheel increases or decreases respectively by a sufficient amount to warrant said increase or decrease.

29. A wind turbine comprising a plurality of blades mounted on a rotor, said rotor having a rotatable shaft with a drivewheel extending outward therefrom, said drivewheel rotating with said shaft and said rotor as said blades rotate, said rotor having a broad range of speed based on a wind speed, a plurality of wheels being in continuous rotatable contact with said drivewheel, said wheels being connected to drive a plurality of generators to produce electricity, said wind turbine not having a gearbox and operating at a variable speed to produce power from said generators that can be synchronized to a grid, said controller being programmed to add or remove a number of generators generating based on a torque of said rotatable shaft.

30. A method of operating a wind turbine, said wind turbine comprising a plurality of blades mounted on a hub to form a rotor, said rotor being mounted on a shaft, said shaft having a drivewheel thereon, a plurality of wheels being in rotatable contact with said drivewheel, said wheels being connected to drive a plurality of generators to produce electricity, said turbine having various means for controlling the speed of said rotor, said generators being connected to an electricity supply to operate said generators as motors, said method comprising:
(a) connecting said controller to monitor several parameters relating to wind speed, wind direction and speed of said drivewheel, connecting said controller to adjust one or more of yaw, pitch, brakes, generator torque demand, and to adjust a number of generators generating in response to changes in one or more of said parameters;
(b) programming said controller to determine when said wind speed is sufficient to rotate said blades, but insufficient to overcome the force required to commence rotation of said blades, said controller then supplying electricity to said generators and operating said generators as motors to commence rotation of said blades until said turbine reaches an operating range of speed.

31. A method as claimed in claim 30 including the steps of shutting down said motors and using said generators as generators to generate electricity from said rotation of said turbine when said turbine reaches an operating range of speed.

32. A method of operating a wind turbine as claimed in claim 31 including the steps of programming said controller to use said generators as an electric brake with up to a 150% torque demand to stop said turbine and terminating said torque demand when said turbine is stopped.

33. A method of operating a wind turbine as claimed in claim 30 including the steps of programming said controller to allow said generators to be used at higher than rated load to overcome wind gusts with a torque demand of at least 120% of said rated load over a short period of time.

34. A method of operating a wind turbine as claimed in claim 33 including the step of programming said controller to operate said generators at up to a torque demand of 150% over said rated load for short periods of time during high speed wind gusts.

35. A method of operating a wind turbine, said wind turbine comprising a plurality of blades mounted on a hub to form a rotor, said rotor being mounted on a shaft, said shaft having a drivewheel thereon, a plurality of wheels being in rotatable contact with said drivewheel, said wheels being connected to drive a plurality of generators to produce electricity, said generators being capable of operating at a torque demand of up to 150%, said turbine having various means for controlling the speed of said rotor, said turbine having a controller to monitor several parameters relating to wind speed, wind direction and speed of said drivewheel, said method comprising programming said controller to use said generators as an electric brake with a torque demand of up to 150% to stop said turbine and to discontinue stud torque demand when said turbine has stopped.

36. A method of operating a wind turbine, said wind turbine comprising a plurality of blades mounted on a hub to form a rotor, said rotor being mounted on a shaft, said shaft having a drivewheel thereon, a plurality of wheels being in rotatable contact with said drivewheel, said wheels being connected to drive a plurality of generators to produce electricity, said generators being capable of operating at higher than rated load, said turbine having various means for controlling the speed of said rotor, said turbine having a controller to monitor several parameters relating to wind speed, wind direction and speed of said drivewheel, said method comprising programming said controller to use said generators at a torque demand at higher than rated load to overcome wind gusts that would otherwise increase a speed of said rotor above a maximum operating speed.

37. A method as claimed in claim 36 including the step of programming said controller to operate said generators at higher than rated load up to a torque demand of 120%.

38. A method as claimed in claim 36 including the stop of programming said controller to operate said generators at higher than rated load up to a torque demand of 150%.

* * * * *